United States Patent [19]
Gotoh

[11] Patent Number: 6,076,267
[45] Date of Patent: Jun. 20, 2000

[54] LEVELING POLE

[75] Inventor: Tatsuo Gotoh, Tokyo, Japan

[73] Assignee: Asahi Kogaku Kogyo Kabushiki Kaisha, Tokyo, Japan

[21] Appl. No.: 08/803,524

[22] Filed: Feb. 20, 1997

[30] Foreign Application Priority Data

| Jan. 22, 1996 | [JP] | Japan | ................................. 8-292031 |
| Feb. 22, 1996 | [JP] | Japan | ................................. 8-034826 |

[51] Int. Cl.$^7$ .............................................. G01C 15/00
[52] U.S. Cl. ................................. 33/293; 33/296; 33/294
[58] Field of Search ............................. 33/293, 294, 296

[56] References Cited

U.S. PATENT DOCUMENTS

| 1,381,023 | 6/1921 | Schwier | ................................. 33/293 |
| 3,110,109 | 11/1963 | Brittenham et al. | ....................... 33/293 |
| 3,117,378 | 1/1964 | Bowen | ....................................... 33/293 |
| 4,471,532 | 9/1984 | Francis | ...................................... 33/294 |

FOREIGN PATENT DOCUMENTS

| 2017913 | 10/1979 | United Kingdom | ..................... 33/293 |

*Primary Examiner*—Bernard Roskoski
*Attorney, Agent, or Firm*—Greenblum & Bernstein, P.L.C.

[57] ABSTRACT

A leveling pole which includes a scale visibly provided on a front surface of the leveling pole and at least two colored divisions formed on the front surface of the leveling pole. A border between two adjacent colored divisions of the at least two colored divisions extends in a longitudinal direction of the leveling pole. One of the two adjacent colored divisions and the other of the two adjacent colored divisions are painted a first color and a second color, respectively. A brightness of the first color is different from a brightness of the second color.

30 Claims, 10 Drawing Sheets

LEVELING POLE

BACKGROUND OF THE INVENTION

1. Field of the Invention

The present invention relates to a leveling pole or rod generally used together with a surveyor's level for measuring a difference in elevation between two points positioned on the ground.

2. Description of the Related Art

In surveying, a level (surveyor's level) is used when a difference in elevation between two points (surveying points) positioned on the ground is to be measured. In general, the level is placed at one of the two points and a leveling pole bearing a scale thereon is placed at the other point. Under this condition the horizontal hairline (reticle) of a telescope provided on the level is set to be real horizontal (i.e., horizontal with respect to gravity) to serve as a reference line to read the scale on the leveling pole, so that the difference in elevation between the two points can be measured based upon the value read from the scale.

A level having a leveling bubble, and an auto-level are both widely known. In the auto-level, the horizontal hairline thereof is automatically set to be real horizontal even if the level is placed on the ground with the horizontal hairline initially being inclined to some degree from the real horizontal.

A level having a telescope provided with an autofocus system has recently been proposed. For instance, an auto-level having a telescope provided with an autofocus system (hereinafter referred to as an "AF auto-level") has been proposed in U.S. patent application Ser. No. 08/579 240, filed on Dec. 28, 1995.

With such a type of AF auto-level, a surveyor does not have to manually focus the telescope of the AF auto-level on a leveling pole, but only has to orient the telescope toward the leveling pole, so that the telescope can automatically focus on the leveling pole.

SUMMARY OF THE INVENTION

An object of the present invention is to provide a leveling pole which makes it possible for the telescope of the AF auto-level to quickly and precisely focus on the leveling pole.

To achieve the object mentioned above, according to an aspect of the present invention, there is provided a leveling pole which includes a scale visibly provided on a front surface of the leveling pole, and at least two colored divisions formed on the front surface. A border between two adjacent colored divisions of the at least two colored divisions extends in a longitudinal direction of the leveling pole. One of the two adjacent colored divisions and the other of the two adjacent colored divisions are painted a first color and a second color, respectively. A brightness of the first color is different from a brightness of the second color. With this arrangement, in the case where the leveling pole is used together with an AF auto-level, the autofocus device of the AF auto-level can quickly and precisely bring the telescope of the AF auto-level into focus on the front surface of the leveling pole, on which the scale is provided, by detecting the border between the two adjacent colored divisions.

Each of the first and second colors may be an achromatic color. In this case, the first and second colors may be black and white, respectively.

Each of the first and second colors may be a chromatic color. In this case, the first and second colors may be of a common hue. The first and second colors may have a same degree of color saturation.

Preferably, the leveling pole further includes a main body on a front surface of which the scale is provided, and at least one movable plate provided on the main body in a manner such that the at least one movable plate is selectively movable between an accommodated position and an operative position, wherein a surface of the at least one movable plate and the front surface of the main body lie in a common plane adjacent to each other when the at least one movable plate is positioned at the operative position, the surface of the at least one movable plate and the front surface of the main body together forming the front surface of the leveling pole, and further wherein the one of the two adjacent colored divisions and the other of the two adjacent colored divisions are the front surface of the main body and the surface of the movable plate, respectively.

Preferably, the at least one movable plate includes two movable plates, one of the two movable plates being positioned on one side of the main body and the other of the two movable plates being positioned on the other side of the main body.

According to another aspect of the present invention, there is provided a leveling pole which includes: a retractable post having a plurality of post pieces, a scale being visibly provided on a front surface of each of the plurality of post pieces; and at least two colored divisions formed on the front surface, wherein a border between two adjacent colored divisions of the at least two colored divisions extends in a longitudinal direction of the leveling pole, wherein the one of the two adjacent colored divisions and the other of the two adjacent colored divisions are painted a first color and a second color, respectively, a brightness of the first color being different from a brightness of the second color.

According to yet another aspect of the present invention, there is provided a leveling pole which includes: a first stripe having a first color which is painted on a front wall of the leveling pole to extend in a longitudinal direction of the leveling pole; a scale having a second color different from the first color which is painted on the first stripe to extend in the longitudinal direction, and at least one second stripe having a third color which is painted on the front wall to extend parallel to the first stripe in the longitudinal direction, the second stripe contacting the first stripe to form a border extending in the longitudinal direction between the first stripe and the at least one second stripe, wherein a brightness of the first color is different from a brightness of the third color.

According to yet another aspect of the present invention, there is provided a leveling pole which includes: a scale visibly formed on a front surface of the leveling pole; and at least two colored divisions formed on the front surface separately from the scale, a border between two of the at least two colored divisions extending in a longitudinal direction of the leveling pole, wherein a brightness of one of the two of the at least two colored divisions is different from a brightness of the other of the two of the at least two colored divisions.

The present disclosure relates to subject matter contained in Japanese Patent Application No.8-34826 (filed on Feb. 22, 1996) and Japanese Patent Application No.8-292031 (filed on Nov. 1, 1996) which are expressly incorporated herein by reference in their entireties.

BRIEF DESCRIPTION OF THE DRAWINGS

The invention will be described below in detail with reference to the accompanying drawings in which similar elements are indicated by similar reference numerals, and wherein.

DESCRIPTION OF THE PREFERRED EMBODIMENTS

Figure 1:
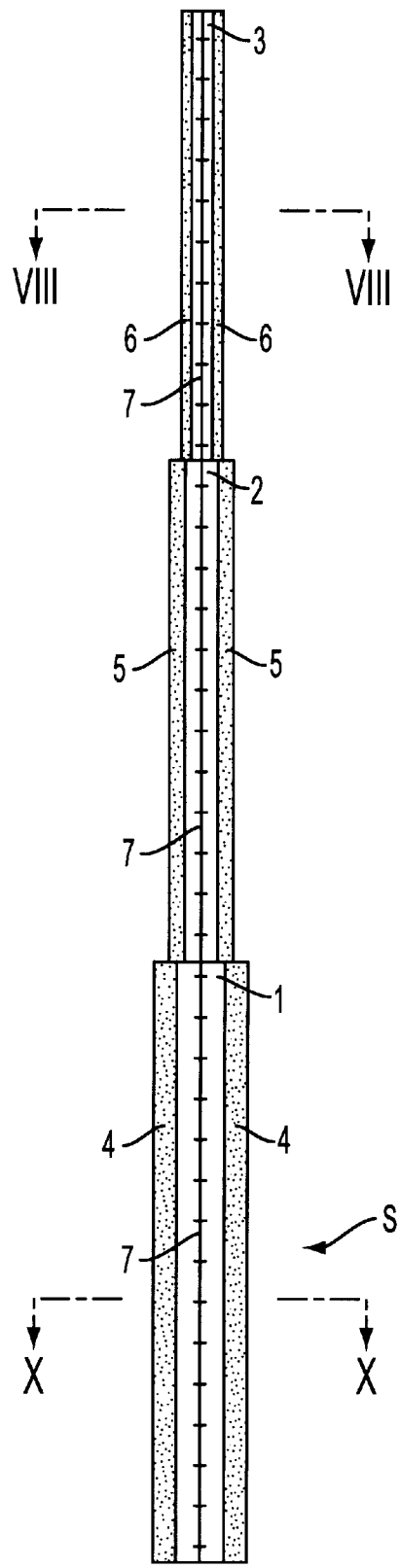
FIG. 1 is a front elevational view of a first embodiment of a leveling pole in its operative condition, to which the present invention is applied.
Figure 2:
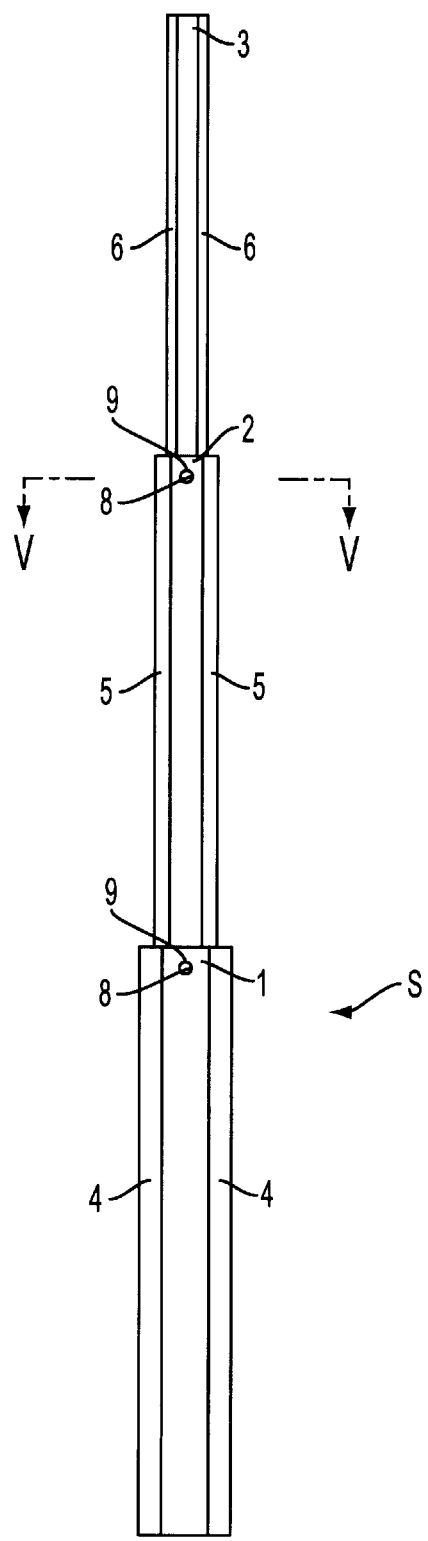
FIG. 2 is a rear elevational view of the leveling pole shown in FIG. 1.
Figure 3:
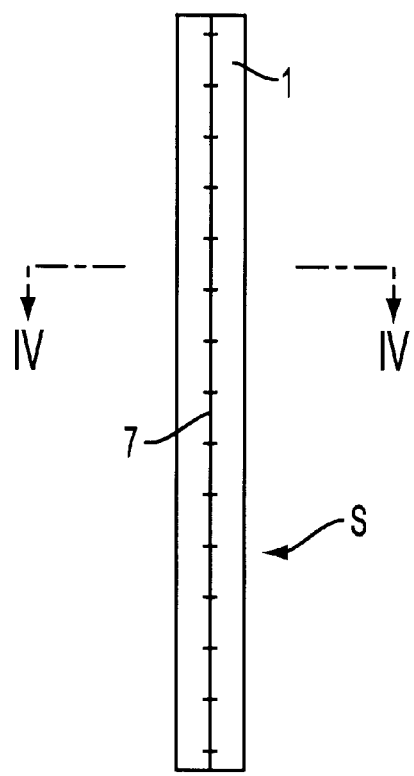
FIG. 3 is a front elevational view of the leveling pole shown in FIG. 1 or 2 in its accommodated condition.

FIGS. 1 through 12 show a first embodiment of a leveling pole S to which the present invention is applied. FIGS. 1 and 2 each show the leveling pole S in an operative condition, and FIG. 3 shows the leveling pole S in an accommodated condition.

The leveling pole S is a telescoping type of leveling pole having three posts, i.e., an outer post 1, a middle post 2 and an inner post 3 in this order from the bottom to the top of the leveling pole S when in the operative condition. The inner post 3 can be slidably inserted into the middle post 2, and the middle post 2 can be slidably inserted into the outer post 1, so that the leveling pole S can be extended when in use or accommodated when not in use, i.e., the posts 1, 2 and 3 are telescoping posts. Each of the three posts 1, 2 and 3 is rectangular in a horizontal cross-section as shown in FIG. 4.

The outer post 1 is hollow having an open end and a closed end at the top and the bottom thereof, respectively. Likewise, the middle post 2 is hollow having an open end and a closed end at the top and the bottom thereof, respectively. The middle post 2 is formed smaller than the outer post 1 so that the middle post 2 can be inserted into the outer post 1. A gap is formed between the inner surface of the outer post 1 and the outer surface of the middle post 2. In other words, the outer width of the middle post 2 is shorter than the inner width of the outer post 1, and the outer depth (thickness) of the middle post 2 is shorter than the inner depth of the outer post 1 so that a gap is formed between the inner surface of the outer post 1 and the outer surface of the middle post 2.

The inner post 3 is formed as a non-hollow (i.e., solid) post. The inner post 3 is smaller than the middle post 2 so that the inner post 3 can be inserted into the middle post 2 and that a gap is formed between the inner surface of the middle post 2 and the outer surface of the inner post 3. In other words, the outer width of the inner post 3 is shorter than the inner width of the middle post 2 and the outer depth (thickness) of the inner post 3 is shorter than the inner depth of the middle post 2 so that a gap is formed between the inner surface of the middle post 2 and the outer surface of the inner post 3.

Figure 4:
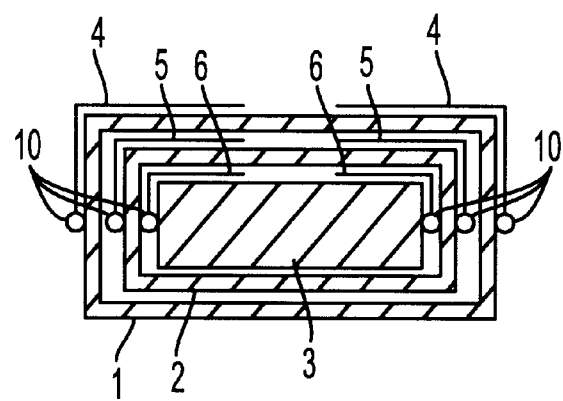
FIG. 4 is a cross-sectional view of the leveling pole along the IV—IV line shown in FIG. 3.

As shown in FIG. 4, the outer, middle and inner posts 1, 2 and 3 are respectively provided with pairs of movable plates 4, 5 and 6. Each plate 4, 5 or 6 has an L-shaped horizontal cross-section and is pivoted at a corresponding hinge 10. Each plate 4, 5 or 6 consists of a first flat portion whose one end is pivoted at the corresponding hinge 10, and a second flat portion which is connected with the other end of the first flat portion and extends perpendicular to the first flat portion. All the hinges (six hinges) 10 extend parallel to each other in a longitudinal direction of the leveling pole S (i.e., a vertical direction as viewed in FIG. 1). Each post 1, 2 or 3 is provided with a pair of hinges 10, one hinge being secured to the right side surface of the post and the other hinge being secured to the left side surface of the post.

Figure 7:
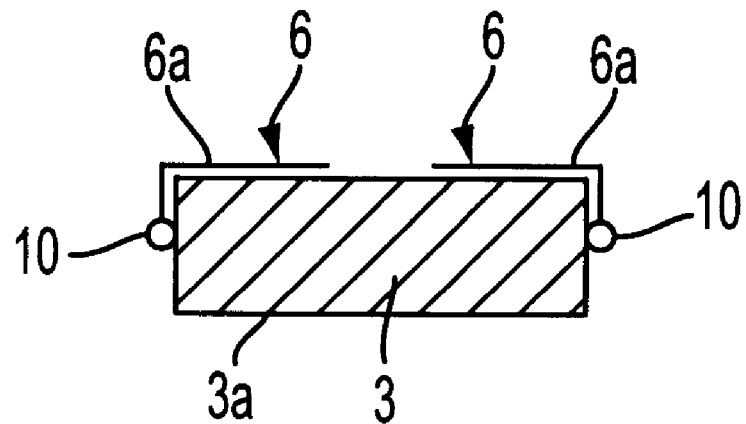
FIG. 7 is a cross-sectional view of the leveling pole along the VII—VII line shown in FIG. 6.
Figure 8:
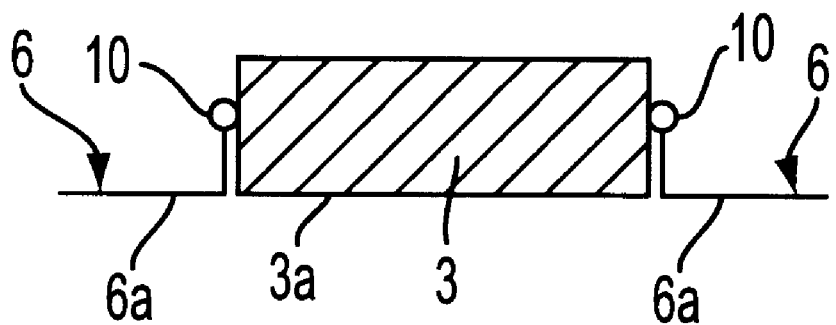
FIG. 8 is a cross-sectional view of the leveling pole along the VIII—VIII line shown in FIG. 1.
Figure 9:
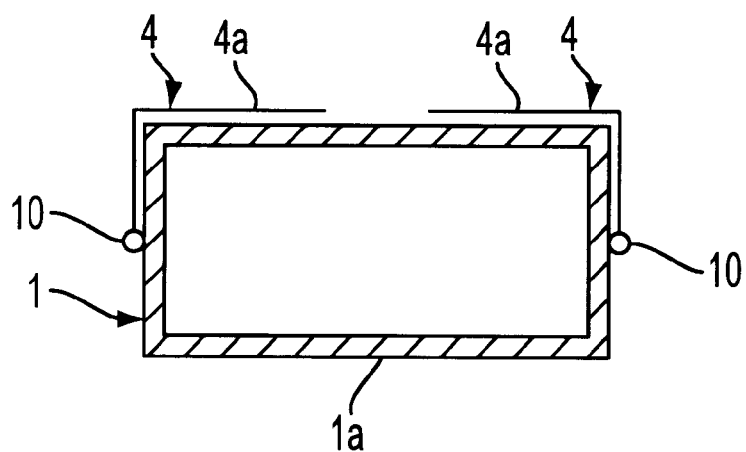
FIG. 9 is a cross-sectional view of the leveling pole along the IX—IX line shown in FIG. 6.
Figure 10:
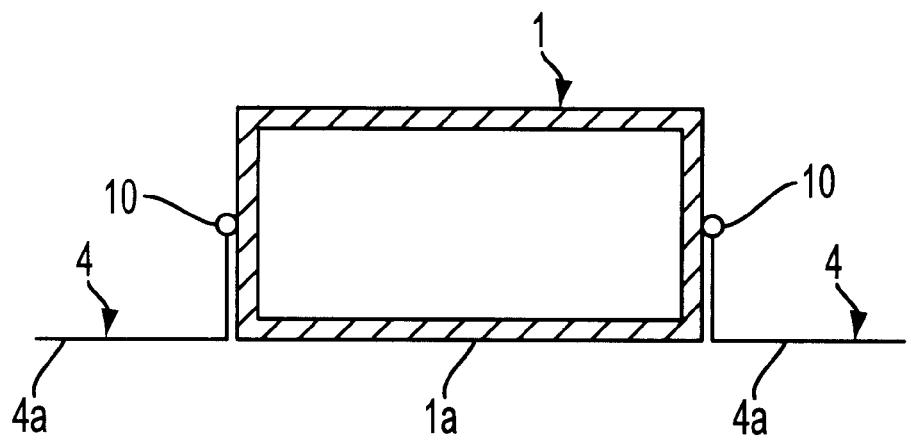
FIG. 10 is a cross-sectional view of the leveling pole along the X—X line shown in FIG. 1.

FIG. 7 shows the inner post 3 when the pair of movable plates 6 are fully closed, and FIG. 8 shows the inner post 3 when the pair of movable plates are fully opened. As can be seen from FIGS. 7 and 8, each movable plate 6 lies along the outer surface of the inner post 3 when in a fully-closed or retracted position, and a front surface 6a of the second flat portion of each movable plate 6 and a front side surface 3a of the inner post 3 lie in a common plane when in a fully-opened position. Likewise, although not shown in FIGS. 7 and 8 each movable plate 5 lies along the outer surface of the middle post 2 when in a fully-closed or retracted position, and a front surface 5a of the second flat portion of each movable plate 5 and a front side surface 2a of the middle post 2 lie in a common plane when in a fully-opened position. Likewise, although not shown in FIGS. 7 and 8 each movable plate 4 lies along the outer surface of the outer post 1 when in a fully-closed or retracted position, and a front surface of the second flat portion of each movable plate 4 and a front side surface 1a of the outer post 1 lie in a common plane when in a fully-opened position.

Hereinafter the movable plates 4 provided on the outer post 1 are referred to as "first movable plates 4", the movable plates 5 provided on the middle post 2 are referred to as "second movable plates 5", and the movable plates 6 provided on the inner post 3 are referred to as "third movable plates 6". All the first, second and third movable plates 4, 5 and 6 are fully opened when the leveling pole S is in use.

As shown in FIG. 4, the second movable plates 5 can be positioned in a gap formed between the outer surface of the middle post 2 and the inner surface of the outer post 1 when the second movable plates 5 are each in the fully-closed position, while allowing the middle post 2 to move relative to the outer post 1 in the longitudinal direction of the leveling pole S. Likewise, the third movable plates 6 can be positioned in a gap formed between the outer surface of the inner post 3 and the inner surface of the middle post 2 when the third movable plates 6 are each in the fully-closed position, while allowing the inner post 3 to move relative to the middle post 2 in the longitudinal direction of the leveling pole S.

The length of the first movable plates 4 in the longitudinal direction of the leveling pole S is the same as that of the outer post 1, whereas the length of the second movable plates 5 in the longitudinal direction of the leveling pole S is shorter than that of the middle post 2 with the upper ends of the second movable plates 5 and the upper end of the middle post 2 lying in a common plane so that a portion for connecting a lower end of the middle post 2 with an upper end of the outer post 1 can be formed at the lower end of the middle post 2. Similarly, the length of the third movable plates 6 in the longitudinal direction of the leveling pole S is shorter than that of the inner post 3 with the upper ends of the third movable plates 6 and the upper end of the middle post 2 lying in a common plane so that a portion for connecting a lower end of the inner post 3 with an upper end of the middle post 2 can be formed at the lower end of the inner post 3.

Figure 5:
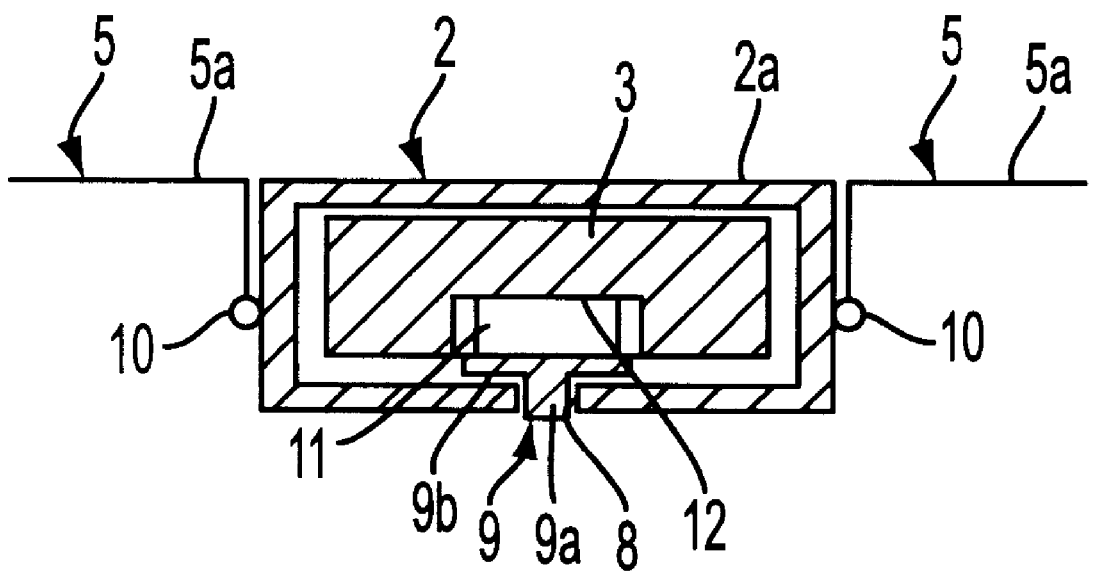
FIG. 5 is a cross-sectional view of the leveling pole along the V—V line shown in FIG. 2.

As shown in FIG. 5, the middle post 2 is provided on a rear side wall thereof with a circular through hole 8 that is positioned at the center of the rear side wall in the vicinity of the upper end of the middle post 2. The inner post 3 is provided on the rear thereof with a corresponding circular recess 12 that is positioned in the vicinity of the lower end of the inner post 3 so as to correspond to the through hole 8. The diameter of the circular recess 12 is larger than the diameter of the through hole 8. A locking member 9 having a circular base plate 9b and a projection 9a which projects from the circular base plate 9b, is provided between the middle post 2 and the inner post 3. The projection 9a is formed to be engageable with the through hole 8. The length of the projection 9a is substantially the same as the thickness of the rear wall of the middle post 2, i.e., the same as the depth of the through hole 8. The diameter of the circular base plate 9b is a little smaller than that of the circular recess 12, so that the locking member 9 can enter the circular recess 12. A compression coil spring 11 is provided in the circular recess 12 between the bottom of the circular recess 12 and the circular base plate 9b so that the locking member 9 is always biased in a rearward direction (downward direction as viewed in FIG. 5) against the rear wall of the middle post 2. The depth of the circular recess 12 is determined such that the projection 9a of the locking member 9 is retreated to be out of the through hole 8 when the locking member 9 is fully pushed into the circular recess 12 against the biasing force of the compression coil spring 11. With such a structure, in the case where the inner post 3 is drawn out of the middle post 2 so as to position the inner post 3 at a fully extended position thereof relative to the middle post 2, the projection 9a engages with the through hole 8 due to the biasing force of the compression coil spring 11 at the moment the projection 9a reaches the position facing the position of the through hole 8, thereby the inner post 3 is positioned at the fully extended position while being restricted to be retracted in the middle post 2. In this state, the tip of the projection 9a and the outer surface of the rear wall of the middle post 2 lie in a common plane, so that the projection 9a can be manually depressed from outside the middle post 2. When the projection 9a is fully depressed the locking member 9 enters into the circular recess 12, so that the projection 9a disengages from the through hole 8. In this state of disengagement of the projection 9a, the inner post 3 can be retracted into the middle post 2. The through hole 8, the locking member 9, the compression coil spring 11 and the circular recess 12 constitute a positioning or locking mechanism for positioning the inner post 3 at the fully extended position relative to the middle post 2. A similar mechanism is provided between the outer post 1 and the middle post 2. Therefore, owing to the aforementioned structures of the leveling pole S with the two positioning mechanisms, the leveling pole S can be either in the fully extended condition (operative condition) shown in FIG. 1 or 2, or in the fully accommodated state (accommodated condition) shown in FIG. 3.

The front surface of each post 1, 2 or 3 is painted white, and a scale 7 is printed on the white-painted front surface of each post 1, 2 or 3 with a black paint along the vertical center of the post. When the leveling pole S is in the fully extended state shown in FIG. 1 or 2, three scales 7 respectively printed on the outer, middle and inner posts 1, 2 and 3 together form a single scale to be observed by a surveyor through the telescope of a level (not shown). Numerical values (not shown) representing a height from the bottom end of the leveling pole S are correspondingly printed beside the markings of each scale 7 on the front surface of each post 1, 2 or 3. The front surfaces 4a, 5a and 6a of the first, second and third movable plates 4, 5 and 6 are each painted black. Therefore, when the leveling pole S is in the operative condition, i.e., when all the first, second and third movable plates 4, 5 and 6 are fully opened as shown in FIG. 1, a center part of the front surface of the leveling pole S is seen white, whereas both sides of the front surface of the leveling pole S are seen black. Each of the two borders between the white portion and the black portion that are seen on the front of the leveling pole S is formed between a side edge of each post 1, 2 or 3 and a ridge of each movable plate 4, 5 or 6 (i.e., an edge between the first and second flat portions of each movable plate 4, 5 or 6) and extends in the longitudinal direction of the leveling pole S. Consequently, when the leveling pole S is in the operative condition, the center of the front surface of the leveling pole S and both sides of the front surface of the leveling pole S are painted with two different colors (black and white) having different brightness, which makes a high contrast (strong contrast) therebetween. The term "brightness" used in this specification is based on a Munsell value according to the Munsell notation system.

The usage of the leveling pole S will be hereinafter discussed. The leveling pole S is used together with a conventional AF auto-level (not shown).

When the leveling pole S is utilized, in the case where the leveling pole S is still in the accommodated condition as shown in FIG. 3, a surveyor (first surveyor) firstly stands the leveling pole S at a first surveying point on the ground with the leveling pole S extending vertically. Subsequently, the surveyor pulls out the middle post 2 from the outer post 1 until the projection 9a has engaged with the through hole 8 to position the middle post 2 at the fully extended position relative to the outer post 1, in the case where a difference between the elevation of the horizontal hair line serving as a reference line of a telescope of the AF auto-level and the elevation of the aforementioned first surveying point is larger than the height of the leveling pole S in the accommodated condition, i.e., the height of the outer post 1. In the case where this difference is less than the height of the outer post 1, it is not necessary for the surveyor to pull out the middle post 2 from the outer post 1.

Figure 6:
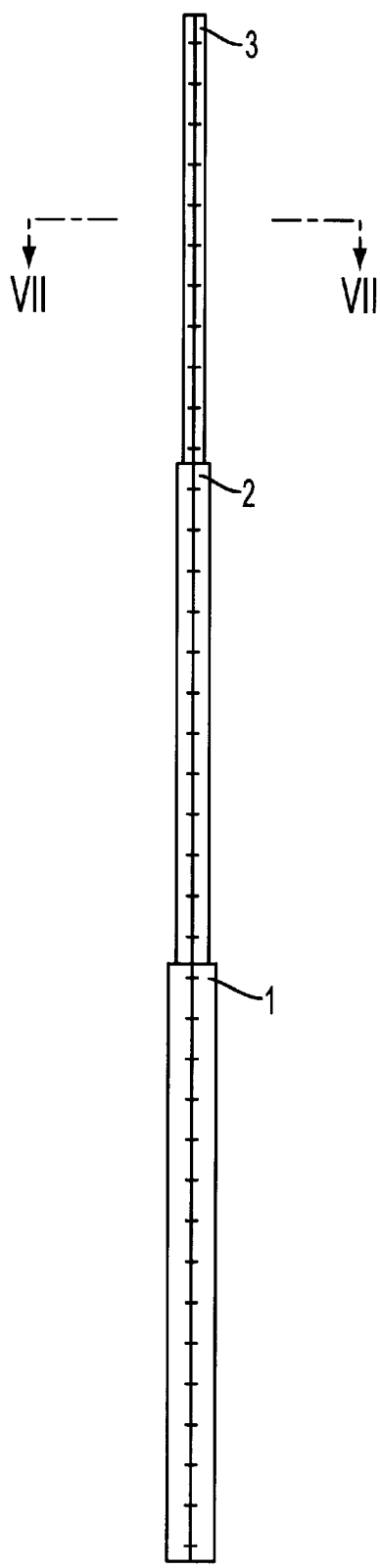
FIG. 6 is a front elevational view of the leveling pole with all movable plates in a retracted state.

Subsequently, the surveyor further pulls out the inner post 3 from the middle post 2 until the projection 9a has engaged with the through hole 8 to position the inner post 3 at the fully extended position relative to the middle post 2, in the case where a difference between the elevation of the horizontal hair line serving as the reference line of a telescope of the AF auto-level and the elevation of the aforementioned first surveying point, is larger than the height of the leveling pole S with the middle post 2 and the inner post 3 being fully extended and accommodated, respectively. Any of the first, second and third movable plates 4, 5 and 6 have still to be opened at this stage. Therefore, at this stage the leveling pole S is in the condition shown in FIG. 6 or 7. It is hereinafter assumed in the following explanations that the leveling pole S has been fully extended as shown in FIG. 6.

After the surveyor has completed to set the leveling pole S on the first surveying point in the manner as described above, the surveyor then opens each movable plate 4, 5 or 6, i.e., the surveyor rotates each movable plate 4, 5 or 6 about the corresponding hinge 10 by 180 degrees. Consequently, the leveling pole S is in the operative condition, i.e., the condition that the front surface 6a of the second flat portion of each movable plate 6 and the front side surface 3a of the inner post 3 lie in a common plane, that the front surface 5a of the second flat portion of each movable plate 5 and the front side surface 2a of the middle post 2 lie in a common plane, and that the front surface of the second flat portion of each movable plate 4 and a front side surface 1a of the outer post 1 lie in a common plane.

Thereafter, another surveyor (second surveyor) who handles the AF auto-level orients the telescope thereof toward the leveling pole S and subsequently actuates an autofocus device of the telescope to be turned ON. In the autofocusing operation of the telescope, the signal-to-noise ratio (S/N) of the signals, which are output from a CCD line sensor provided in the autofocus device of the telescope for focusing when the autofocus device performs an autofocusing operation using a phase difference detecting method, can be made high because the contrast between the white-painted front side surface of each post 1, 2 or 3 and the black-painted front surface of the second flat portion of each movable plate 4, 5 or 6 is very high. As a result, the autofocus device of the AF auto-level can quickly and precisely bring the telescope into focus on the front face of the leveling pole S, on which the scale 7 is printed, by detecting the border or borders between the white painted part and the black painted part on the front face of the leveling pole S, without regard to the color, brightness or patterns of the background of the leveling pole S, or even if the distance between the AF auto-level and the leveling pole S is long.

The width of the leveling pole S becomes almost twice as much as its original width (width in the accommodated condition) by opening each movable plate 4, 5 or 6. The wider the width of the leveling pole S is, the higher the reliability of the focus information obtained through the aforementioned CCD line sensor is, because an area on the CCD line sensor on which an image of the leveling pole S is formed increases relative to the other area on the CCD line sensor on which the background of the leveling pole S is formed. Due to this reason, the use of the AF auto-level with the leveling pole S makes the AF auto-level finely operate the autofocus device thereof even if the distance between the AF auto-level and the leveling pole S is long.

A conventional type of leveling pole has a structure such that a scale is merely painted black on a white-colored front surface of the leveling pole. When the AF auto-level is used with such a conventional type of leveling pole, the autofocus device of the AF auto-level sometimes does not work properly in the case where the background of the leveling pole, seen through the telescope of the AF auto-level, is monotonous scenery having a high brightness, e.g., a part of the sky or a surface of a monochromatic wall. This problem arises due to the fact that a high contrast does not occur between the front face of the leveling pole on which the scale is printed and the background of the leveling pole. This problem seldom arises when a distance between the AF auto-level and the leveling pole is short since the autofocus device of the AF auto-level can detect a high contrast only from the leveling pole itself, i.e., a contrast between a black-painted scale and a white-painted part of the front surface of the leveling pole. However, this problem often arises when the distance is long because the autofocus device of the AF auto-level cannot detect a high contrast only from the leveling pole. However, when the AF auto-level is used with the leveling pole S to which the present invention is applied, the occurrence of such a problem is reduced as noted above.

After the telescope of the AF auto-level has been brought into focus on the leveling pole S, the surveyor looks through the telescope to read the scale 7 on the leveling pole S so as to obtain a numerical value (height).

Thereafter, the first surveyor moves the leveling pole S to a second surveying point on the ground to stand the leveling pole S at the second surveying point with the leveling pole S extending vertically. Thereafter, the second surveyor reads the scale 7 on the leveling pole S to obtain a numerical value (height), in a similar manner as noted above.

Thereafter the difference between the above obtained two numerical values read is calculated. The calculated value thus obtained is the difference in elevation between the first and second surveying points.

After such surveying work is completed, the first or second surveyor closes all the first, second and third movable plates 4, 5 and 6, i.e., rotates all the movable plates 4, 5 and 6 about the corresponding hinge 10 by 180 degrees in such a manner that each movable plate 4, 5 or 6 fits along the outer surface of the corresponding post 1, 2 or 3 as shown in FIG. 4. Thereafter, the surveyor depresses the projections 9a in turn to disengage each projection 9a from the corresponding through hole 8, and subsequently inserts the inner and middle posts 3 and 2 back into the outer post 1 by turns to thereby return the leveling pole S back into the accommodated condition shown in FIG. 3.

The above explanations about the usage of the leveling pole S are directed to the usage of the leveling pole S used with an AF auto-level. However, in the usage of the leveling pole S with a regular auto-level (an auto-level not having an autofocus device) or a manual level, use of the leveling pole S is still effective. In the usage of the leveling pole S with such a regular auto-level or a manual level having no autofocus device, the telescope is manually brought into focus on the leveling pole S by a surveyor by means of the surveyor looking at the leveling pole S through the telescope with his/her naked eye. During this manual focusing operation, the surveyor can advantageously use each border, seen between the white painted part and the black-painted part on the front face of the leveling pole S, as a reference line for focusing in order to precisely bring the telescope into focus on the scale 7. In other words, in the manual focusing operation, the telescope is precisely brought into focus on the scale 7 when a sharp image of the border is seen through the telescope, whereas the telescope is out of focus on the scale 7 when a blurry image of the border is seen through the telescope. It is quite easy for the surveyor to figure out the image of the border to be seen sharp or blurry because a contrast between the two colors (black and white) respectively painted on the front surface of the second flat portion of each movable plate 4, 5 or 6 and the front side surface of each post 1, 2 or 3, is high. Accordingly, the surveyor can easily and precisely bring the telescope of the regular auto-level or the manual level into focus on the leveling pole S.

Figure 11:
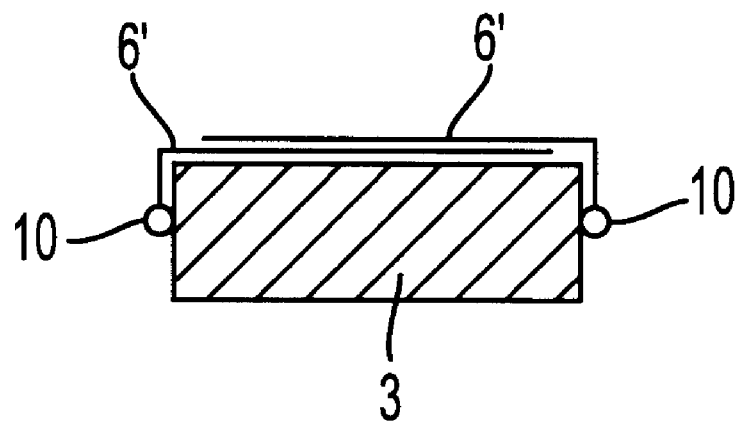
FIG. 11 is a cross-sectional view of the leveling pole along the VII—VII line shown in FIG. 6 in the case where each movable plate is formed longer than that shown in FIG. 7 or 8.
Figure 12:
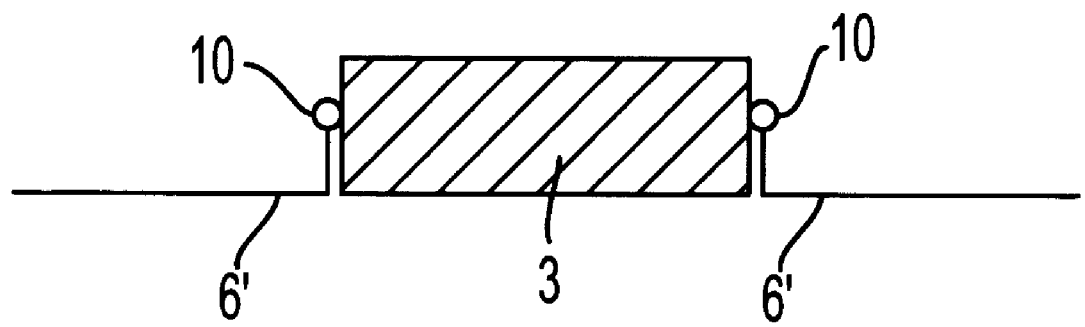
FIG. 12 is a cross-sectional view of the leveling pole along the VIII—VIII line shown in FIG. 1 in the case where each movable plate is formed longer than that shown in FIG. 7 or 8.

The width of each of the first, second and third movable plates 4, 5 and 6 (i.e., the width of the second flat portion of each of the first, second and third movable plates 4, 5 and 6) is about half of the width of the corresponding outer, middle or inner post 1, 2 or 3. However, the width of each of the first, second and third movable plates 4, 5 and 6 can be formed longer, up to almost the width of the corresponding outer, middle or inner post 1, 2 or 3. In the case of the width of each movable plate 4, 5 or 6 being formed longer, one movable plate 4, 5 or 6 is placed over the other corresponding movable plate 4, 5 or 6 when those two corresponding plates are closed. FIGS. 11 and 12 show the third movable plates 6' formed longer than the third movable plates 6. The first and second movable plates 4 and 5 can be formed longer in a similar manner. According to the leveling pole S having such longer movable plates, the width of the leveling pole S in the operative condition becomes very wide, which is helpful for increasing the reliability of the autofocus information of the AF auto-level.

In the above first embodiment, as mentioned before, the front side surfaces 1a, 2a and 3a of the outer, middle and inner posts 1, 2 and 3 are each painted white, the scale 7 is printed black, and the front surfaces 4a, 5a and 6a of the first, second and third movable plate 4, 5 and 6 are each painted black. However, a similar effect can be expected in the case where the coloring is reversed, i.e., in the case where the front side surfaces 1a, 2a and 3a of the outer, middle and inner posts 1, 2 and 3 are each painted black, the scale 7 is printed white, and the front surfaces 4a, 5a and 6a of the first, second and third movable plates 4, 5 and 6 are each painted white.

Figure 13:
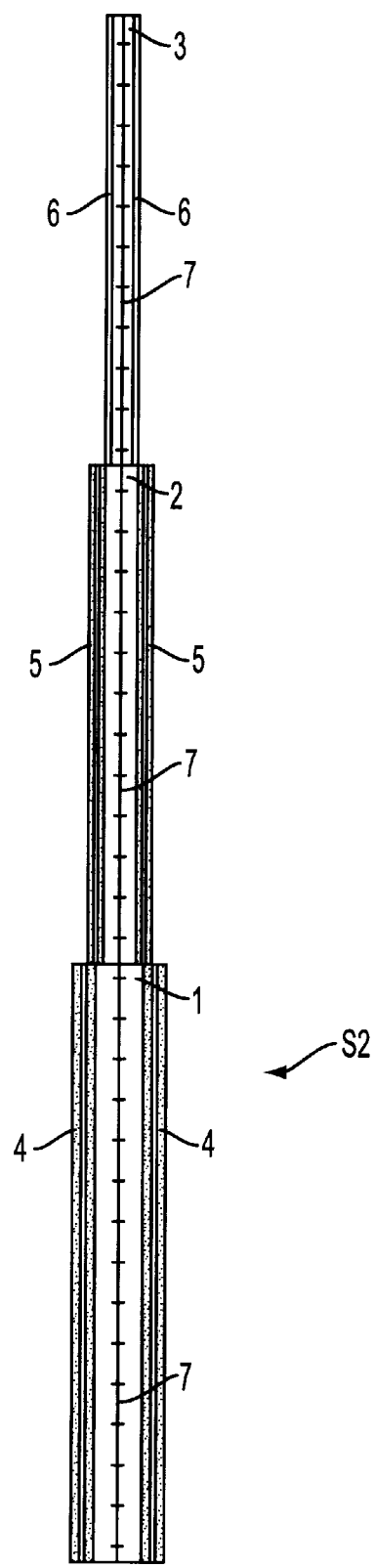
FIG. 13 is a front elevational view of a second embodiment of a leveling pole in its operative condition, to which the present invention is applied.

FIG. 13 shows a second embodiment of a leveling pole S2 to which the present invention is applied. As shown in FIG. 13, two parallel black vertical stripes are painted on the front surface 4a, 5a or 6a of each of the first, second and third movable plates 4, 5 and 6 of the leveling pole S2, with a vertical white strip being painted between the two black vertical stripes. Except for this difference the second embodiment of the leveling pole S2 is the same as the first embodiment of the leveling pole S.

The leveling pole S2 has six color border lines in a horizontal direction (widthwise direction of the leveling pole S2) on its front face, whereas the leveling pole S of the first embodiment has two color border lines in the same direction. Therefore, the chances that the autofocus device of the AF auto-level obtains a high contrast image of the leveling pole S2 increases, as compared with the case where the leveling pole S of the first embodiment is used. Therefore, the focusing operation can be more easily and more precisely carried out with the leveling pole S2 of the second embodiment.

In the above first and second embodiments, the leveling pole S has three posts, i.e., the outer, middle and inner posts 1, 2 and 3. However, the number of posts is not limited to three but may be two or less or four or more posts. Furthermore, although a pair of movable plates 4, 5 or 6 are provided on each of the outer, middle and inner posts 1, 2 and 3 in the first and second embodiments, only one movable plate 4, 5 or 6 may be provided on each of the outer, middle and inner posts 1, 2 and 3.

In the above first and second embodiments, each of the movable plates 4, 5 and 6 is pivoted at the corresponding hinge 10 so that each movable plate can be selectively moved between the retracted position and the operative position. Instead of using the hinge 10, a guide rail mechanism may be used. In this case, each movable plate 4, 5 or 6 is formed substantially in a flat shape to be retracted in or drawn out of the corresponding post 4, 5 or 6 through the guide rail mechanism.

In the second embodiment, more than two parallel black vertical stripes may be painted on the front surface 4a, 5a or 6a of each of the first, second and third movable plates 4, 5 and 6 of the leveling pole S2.

Figure 14:
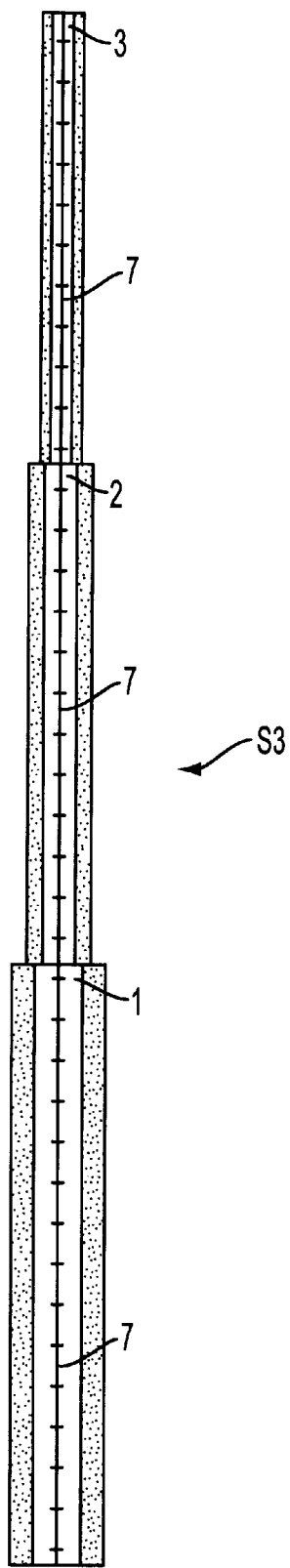
FIG. 14 is a front elevational view of a third embodiment of a leveling pole in its operative condition, to which the present invention is applied.

FIG. 14 shows a third embodiment of the leveling pole S3 to which the present invention is applied. The difference between the leveling pole S of the first embodiment and the leveling pole S3 of the third embodiment is that the leveling pole S3 is not provided with any movable plates 4, 5 and 6, and that two parallel black vertical stripes are painted on the front side surface 1a, 2a or 3a of each of the outer, middle and inner posts 1, 2 and 3, with a vertical white strip portion, on which the scale 7 is printed, being left between the two black vertical stripes. Except for this difference the leveling pole S3 is the same as the leveling pole S of the first embodiment. According to the leveling pole S3 having such a structure, the telescope of the AF auto-level can be quickly and precisely focused on the leveling pole S3, similar to the leveling pole S or S2.

The color to be used for painting the scale 7, the front surfaces 1a, 2a and 3a of the posts 1, 2 and 3, or the front surfaces 4a, 5a and 6a of the movable plates 4, 5 and 6 is not limited solely to achromatic color, i.e., black and white. Not only achromatic color but also chromatic color may be used as long as there is a difference in brightness between the two colors to be used. In other words, as long as there is a difference in brightness between the two colors to be used, any color may be used without regard to its hue or degree of color saturation. In the case where neither black nor white is used, two colors of a common hue having a difference in brightness therebetween may be used. For instance, in the case of using green as the common hue, a bright green and a dark green can be used. The two colors of a common hue may have the same degree of color saturation.

As can be understood from the foregoing, according to any of the leveling poles S, S2 and S3 to which the present invention is applied, the telescope of an AF auto-level can be quickly and precisely focused on the leveling pole S, thus leading to efficient and precise surveying work.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A leveling pole, comprising:
    a main body; and
    at least one movable plate provided on said main body, said at least one movable plate extending along substantially an entire length of said main body, said at least one movable plate being selectively movable between an accommodated position in which said at least one movable plate conforms to a perimeter of said main body and an operative position in which said main body and said at least one movable plate form a front surface of said leveling pole wider than a width of said main body alone;
    a scale visibly provided on said front surface of said leveling pole, and at least two solid colored divisions formed on said front surface of said leveling pole, wherein a border between adjacent solid colored divisions extends substantially continuously in a line over the length of the leveling pole in a longitudinal direction of said leveling pole and parallel to said longitudinal direction, wherein said adjacent colored divisions are painted a first color and a second color, respectively, a brightness of said first color being different from a brightness of said second color to form a contrasting-brightness border extending in a line substantially continuously over the length of the leveling pole and parallel to said longitudinal direction.

2. The leveling pole according to claim 1, wherein each of said first and second colors is an achromatic color.

3. The leveling pole according to claim 2, wherein said first and second colors are black and white, respectively.

4. The leveling pole according to claim 1, wherein each of said first and second colors is a chromatic color.

5. The leveling pole according to claim 4, wherein said first and second colors are of a common hue.

6. The leveling pole according to claim 5, wherein said first and second colors have a same degree of color saturation.

7. The leveling pole according to claim 1, said scale being provided on a front surface of said main body, wherein a surface of said at least one movable plate and a surface of said main body lie in a common plane adjacent to each other when said at least one movable plate is positioned at said operative position, said surface of said at least one movable plate and said surface of said main body together forming said front surface of said leveling pole, and wherein said adjacent colored divisions are respectively formed on said surface of said main body and said surface of said at least one movable plate.

8. The leveling pole according to claim 7, wherein said main body comprises two front edges extending in said longitudinal direction, said surface of said main body being positioned between said two front edges.

9. The leveling pole according to claim 8, wherein said at least one movable plate comprises an edge extending in said longitudinal direction, said edge of said movable plate contacting one of said two front edges of said main body when said at least one movable plate is positioned at said operative position.

10. The leveling pole according to claim 8, wherein said at least one movable plate comprises two movable plates, said two movable plates being positioned on opposite sides of said main body.

11. The leveling pole according to claim 10, wherein each of said two movable plates comprises an edge extending in said longitudinal direction, said two edges of said two movable plates respectively contacting said two front edges of said main body when said two movable plates are positioned at said operative position.

12. The leveling pole according to claim 7, wherein said at least one movable plate is connected to said main body through a hinge, said at least one movable plate being rotatable at said hinge to selectively move between said accommodated position and said operative position.

13. The leveling pole according to claim 7, wherein said at least one movable plate extends in said longitudinal direction and said at least one movable plate has an L-shaped cross-section in a direction normal to said longitudinal direction.

14. The leveling pole according to claim 13, wherein said at least one movable plate is connected to said main body through a hinge, said at least one movable plate being rotatable at said hinge to selectively move between said accommodated position and said operative position.

15. The leveling pole according to claim 1, wherein said scale is provided on one of said at least two colored divisions.

16. The leveling pole according to claim 15, wherein said scale is provided on one of said two adjacent colored divisions.

17. The leveling pole according to claim 1, wherein said leveling pole comprises a plurality of telescoping posts, one of said plurality of telescoping posts being capable of being retracted into another of said plurality of telescoping posts so that a total length of said leveling pole can be varied.

18. The leveling pole according to claim 7, wherein said main body comprises a plurality of telescoping posts, one of said plurality of telescoping posts being capable of being retracted into another of said plurality of telescoping posts so that a total length of said leveling pole can be varied, and wherein each of said plurality of telescoping posts is provided with said at least one movable plate.

19. A leveling pole, comprising:

a main body; and at least one movable plate provided on said main body, said at least one movable plate extending along substantially an entire length of said main body, said at least one movable plate being selectively movable between an accommodated position in which said at least one movable plate conforms to a perimeter of said main body and an operative position in which said main body and said at least one movable plate form a front wall of said leveling pole wider than a width of said main body alone;

a solid first stripe, of a first color, painted on said front wall of said leveling pole extending substantially continuously in a line over the length of the leveling pole in a longitudinal direction of said leveling pole and parallel to said longitudinal direction;

a scale of a second color different from said first color painted on said solid first stripe extending in said longitudinal direction; and at least one solid second stripe having a third color painted on said front wall extending substantially continuously in a line over the length of the leveling pole parallel to said solid first stripe, said solid second stripe contacting said solid first stripe to form a border extending in said longitudinal direction between said solid first stripe and said at least one solid second stripe, wherein a brightness of said first color is different from a brightness of said third color to form a contrasting-brightness border extending substantially continuously over the length of the leveling pole and parallel to said longitudinal direction.

20. The leveling pole according to claim 19, wherein each of said first and third colors is an achromatic color.

21. The leveling pole according to claim 20, wherein said first color is one of black or white and said third color is the remaining one of black or white.

22. The leveling pole according to claim 19, wherein each of said first and third colors is a chromatic color.

23. The leveling pole according to claim 22, wherein said first and third colors are of a common hue.

24. The leveling pole according to claim 23, wherein said first and third colors have a same degree of color saturation.

25. The leveling pole according to claim 19, wherein said first color is white, said second color is black and said third color is black.

26. The leveling pole according to claim 19, wherein said first color is black, said second color is white and said third color is white.

27. A leveling pole, comprising:

a main body;

at least one movable plate provided on said main body, said at least one movable plate extending along substantially an entire length of said main body, said at least one movable plate being selectively movable between an accommodated position in which said at least one movable plate conforms to a perimeter of said main body and an operative position in which said main body and said at least one movable plate form a front surface of said leveling pole wider than a width of said main body alone;

a scale visibly formed on said front surface of said leveling pole; and at least two solid colored divisions formed on said front surface of said leveling pole separately from said scale, a border between two of said at least two solid colored divisions extending substantially continuously in a line over the length of the leveling pole in a longitudinal direction of said leveling pole and parallel to said longitudinal direction, wherein a brightness of one of said two of said at least two solid colored divisions is different from a brightness of the remaining one of said two of said at least two solid colored divisions to form a contrasting-brightness border extending substantially continuously over the length of the leveling pole and parallel to said longitudinal direction.

28. The leveling pole according to claim 1, wherein at least three solid colored divisions are formed on said front surface of said leveling pole, wherein two borders between adjacent solid colored divisions extend substantially continuously in respective lines over the length of the leveling pole parallel to said longitudinal direction of said leveling pole, to form two contrasting-brightness borders extending substantially continuously over the length of the leveling pole parallel to said longitudinal direction.

29. The leveling pole according to claim 1, wherein at least seven solid colored divisions are formed on said front surface of said leveling pole, wherein six borders between adjacent solid colored divisions extend substantially continuously in respective lines over the length of the leveling pole parallel to said longitudinal direction of said leveling pole, to form six contrasting-brightness borders extending substantially continuously over the length of the leveling pole parallel to said longitudinal direction.

30. A leveling pole, comprising:

a main body formed as a retractable telescoping post having a plurality of post pieces; and at least one movable plate provided on at least one post piece, said at least one movable plate being selectively movable between an accommodated position in which said at least one movable plate conforms to a perimeter of said at least one post piece and an operative position in which said at least one post piece and said at least one movable plate form a front surface of said leveling pole wider than a width of said at least one post piece alone;

a scale visibly provided on said front surface of said leveling pole, and at least two solid colored divisions formed on said front surface of said leveling pole, wherein a border between adjacent solid colored divisions extends substantially continuously in a line over the length of the leveling pole in a longitudinal direction of said leveling pole and parallel to said longitudinal direction, wherein said adjacent colored divisions are painted a first color and a second color, respectively, a brightness of said first color being different from a brightness of said second color to form a contrasting-brightness border extending in a line substantially continuously over the length of the leveling pole and parallel to said longitudinal direction.

* * * * *